United States Patent [19]

Hensel

[11] Patent Number: 5,427,456

[45] Date of Patent: Jun. 27, 1995

[54] FLUID BEARING WITH ASYMMETRICAL GROOVE PATTERN

[75] Inventor: Robert J. Hensel, Gaston, Oreg.

[73] Assignee: Synektron Corporation, Portland, Oreg.

[21] Appl. No.: 226,310

[22] Filed: Apr. 12, 1994

[51] Int. Cl.6 ............................................. F16C 32/00
[52] U.S. Cl. .................... 384/112; 384/113; 384/115; 384/123; 384/130; 384/292
[58] Field of Search ............... 384/112, 113, 292, 130, 384/115, 123

[56] References Cited

U.S. PATENT DOCUMENTS 5,018,880  5/1991  Nakasugi et al. ............... 384/112
5,096,309  3/1992  Nakasugi et al. ............... 384/292
5,273,368  12/1993  Asada et al. .................... 384/113
5,322,369  6/1994  Kataoka et al. .................. 384/112

Primary Examiner—Lenard A. Footland
Attorney, Agent, or Firm—Chernoff, Vilhauer, McClung & Stenzel

[57] ABSTRACT

An electric motor construction includes a rotor housing and sleeve which surrounds a shaft/thrust plate. The thrust plate is enclosed in a dead end cavity and is surrounded by a fluid which forms a fluid bearing. The shaft has asymmetrical grooves which create a net pressure gradient from a capillary seal formed near the bottom of the shaft toward the dead end cavity. This helps maintain the capillary seal and reduce the risk of cavitation.

10 Claims, 3 Drawing Sheets

FLUID BEARING WITH ASYMMETRICAL GROOVE PATTERN

BACKGROUND OF THE INVENTION

The following invention relates to an electric motor construction employing a fluid bearing, and in particular relates to a hydrodynamic fluid bearing in which asymmetric journal grooves create a pressure gradient in the bearing fluid that directs pressure toward a dead end thrust plate cavity.

Because of run out, vibration, and other problems associated with ball bearings in small electric motors, such as the type used for computer disk drives, some motors now make use of fluid hydrodynamic bearings. Bearings of this type are shown in the U.S. patents to Titcomb U.S. Pat. No. 5,112,142, Shinohara U.S. Pat. No. 4,445,793 and Anderson U.S. Pat. No. 4,726,693.

Hydrodynamic bearings provide the advantage that there are no moving surfaces in direct contact with each other. Instead, fluid of a predetermined viscosity used for the bearing is placed in the gap between the motor's shaft and a sleeve formed in the housing. The shaft and the housing sleeve rotate with respect to each other. The shaft typically includes at least one axial load bearing thrust plate. A clearance space or gap is present in the axial direction between the thrust plate and the housing, as well as in the radial direction between the sleeve and the shaft and the outer ends of the thrust plate. Typically the ends of the thrust plate and/or shaft are exposed to the outside atmosphere and a capillary seal is used to retain the bearing fluid.

It is important that with this construction bearing fluids remain free of cavitation. Cavitation can occur when the pressure in the lubricant falls to the vapor pressure of the gasses in the lubricant, which is less than the partial pressure of the dissolved gases. In order to maintain pressure in the fluid, designers typically include equalization ports that allow circulation of the bearing fluid from one gap region to another gap region. In Titcomb U.S. Pat. No. 5,112,142 a plurality of bearing pressure equalization ports connect the clearance spaces for the thrust plates and the shaft to ensure proper equalization of fluid pressures within the bearing. Anderson et al. U.S. Pat. No. 4,726,693 uses a groove pattern journaled into the shaft together with equalization ports to recirculate oil from an oil reservoir to a journal zone. One problem with the designs described above is that all are difficult to machine and to manufacture.

Other devices such as that shown in Shinohara U.S. Pat. No. 4,445,793 include multiple fluid bearing zones between various portions of the shaft, thrust plate and sleeve. This creates opportunities for the bearings to leak because tolerances for these bearing zones are difficult to control in the manufacture of the motors. They also require a number of ambient air ports which are costly to manufacture.

SUMMARY OF THE INVENTION

The present invention is a fluid bearing construction for an electric motor which includes a shaft having a thrust plate coupled to a first end of the shaft and a housing, which may be either a rotor or a stator, having a journaled sleeve for receiving the shaft. A first portion of the sleeve has a diameter slightly larger than the shaft and a second portion has a larger diameter which is slightly larger than the diameter of the thrust plate. An end cap is inserted into the second diameter portion sealing the thrust plate off from the outside atmosphere and forming an internal dead end cavity in the housing. A bearing fluid surrounds the thrust plate and the shaft and forms a capillary seal near a second end of the shaft. A pressure gradient in the hydrodynamic fluid is provided by asymmetrical herringbone-shaped grooves which are journaled either into the shaft, or into the sleeve enclosing the shaft. This creates a pressure gradient in hydrodynamic fluid from the capillary seal toward the dead end cavity housing the thrust plate.

In addition, the thrust plate may have spiral or V-shaped grooves machined into its upper and lower surfaces where the grooves on the underside of the thrust plate (adjacent the shaft) provide an outward pressure for the hydrodynamic fluid, and grooves on the top side of the thrust plate provide an inward pressure action. In this way a pressure gradient is maintained between the capillary seal near the opposite end of the shaft and the dead end cavity at the top of the thrust plate, thus ensuring that the pressure in the hydrodynamic fluid never falls below the fluid's vapor pressure, thereby greatly reducing the risk of cavitation. The dead end design provides a fully filled fluid bearing zone, such that there is but a single capillary sealed region for retaining the fluid. In addition, a barrier film is used below the capillary seal to create a low energy surface at the liquid-solid interface at the corners of the shaft and sleeve, respectively.

The foregoing and other objectives, features, and advantages of the invention will be more readily understood upon consideration of the following detailed description of the invention, taken in conjunction with the accompanying drawings.

DETAILED DESCRIPTION OF THE INVENTION

Figure 1:
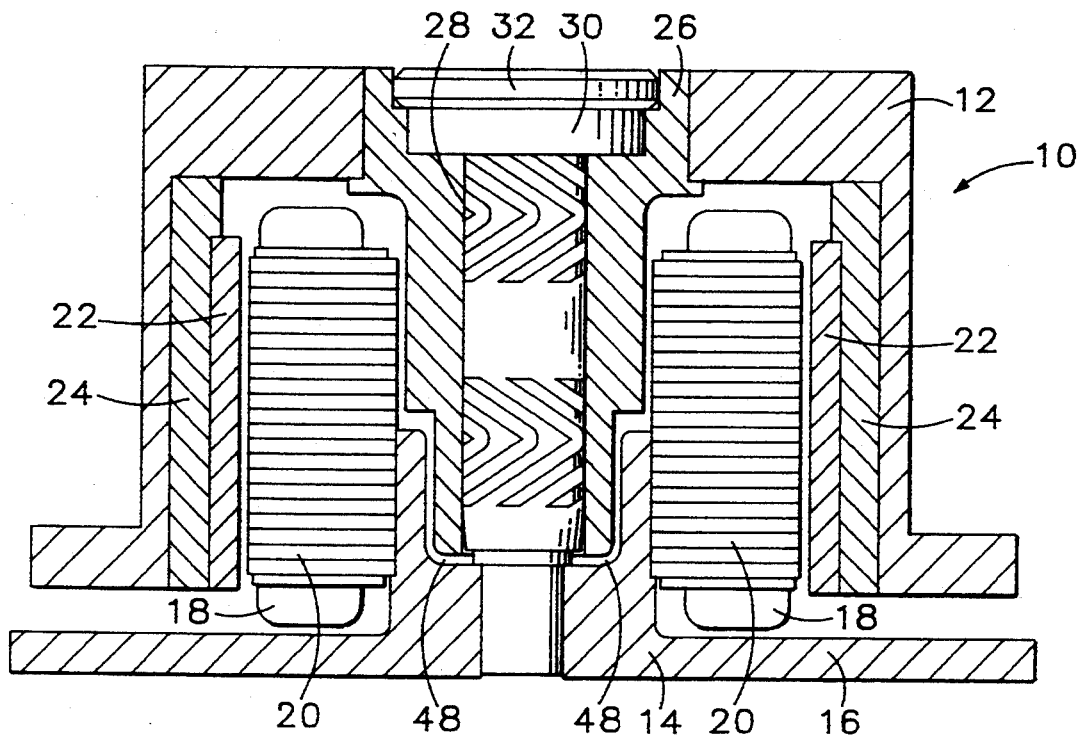
FIG. 1 is a side cutaway view of an electric motor employing the fluid bearing of the present invention.

Referring to FIG. 1 an electric motor 10 includes a rotary hub 12 and a stator 14 which includes a base portion 16 and stator coils 18 which have cores of laminar plates 20 or the like. The rotary hub includes permanent magnet elements 22 of generally conventional design. These may be poles of a single ring magnet having multiple poles. The magnets or poles 22 are held in a magnet sleeve 24.

Figure 1A:
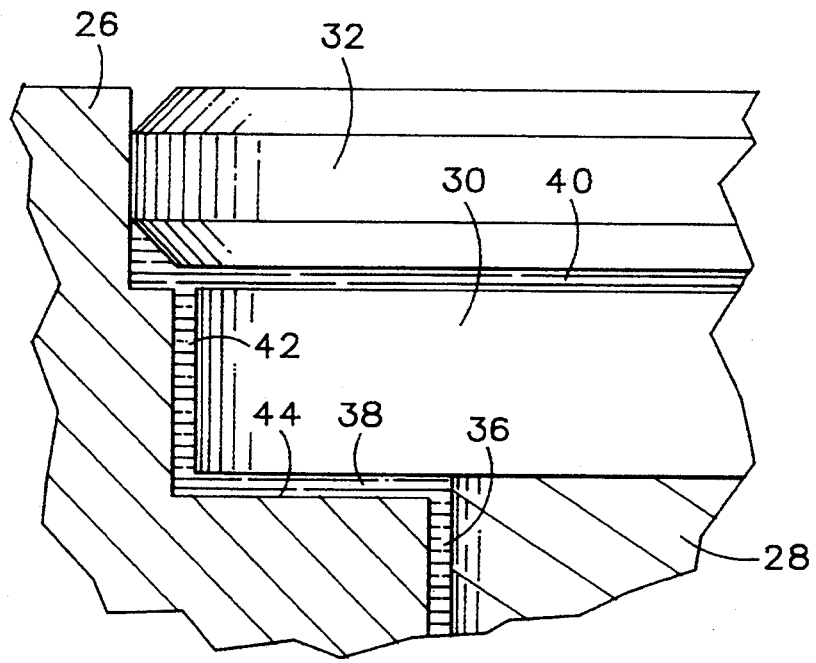
FIG. 1A is an enlarged partial view of an upper portion of the motor of FIG. 1.

The hub 12 includes a sleeve 26. Inside the sleeve 26 is a shaft 28 which is journaled into the base 16 of the stator portion 14. The shaft 28 includes an axial load thrust plate 30 at one end thereof. The thrust plate 30 is sealed off from the outside by an end cap 32 which creates what is known as a dead end design because of the physical seal formed by the cap 32 and the sleeve 26. Referring to FIG. 1A, which is an enlarged view of a portion of the motor of FIG. 1, there is a radial gap 36 between the sleeve 26 and the shaft 28 as well as an axial gap 38 between the bottom of the thrust plate and the sleeve, and a clearance 40 between the top of the thrust plate 30 and the end cap 32. Finally, there is a radial gap 42 between the sleeve 26 and the radially outer-most end of the thrust plate 30. Collectively the gaps 38, 42 and 40 form a dead end cavity for the thrust plate 30. All of the gaps 40, 42, 38 and 36 are filled with a lubricating fluid or oil 44 which forms a fluid bearing and allows the hub 12 and the sleeve 26 to rotate with respect to the shaft 28 and the thrust plate 30.

Figure 7:
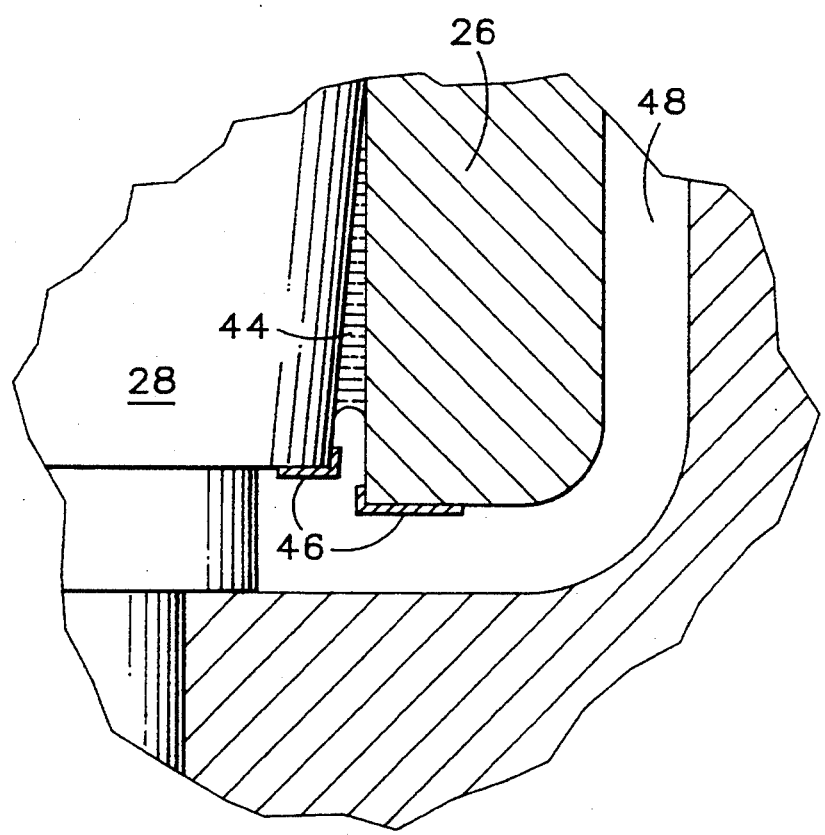
FIG. 7 is an expanded view of a lower portion of FIG. 1 showing a capillary seal.

Referring to FIG. 7 the gap 36 extends all the way to the bottom of the shaft 28 where it is tapered so that the oil 44 may form a capillary seal by surface tension. In order to aid in the formation of the surface tension seal, a barrier film 46 is placed on the bottom of the sleeve 26 and the bottom of the shaft 28. The capillary seal communicates with the outside atmosphere through an opening 48. The barrier film 46 serves to create a low energy surface on the solid surfaces of the shaft and sleeve. The film 46 makes the solid/liquid surface tension higher than the sum of the solid/gas surface tension and the liquid/gas surface tension. In addition the corners at the bottom of the sleeve 26 and shaft 28 respectively are milled to form sharp angles which also makes it more difficult for the surface tension seal to break in the event that the oil 44 approaches that region of the shaft and sleeve. An appropriate barrier film for this purpose is manufactured by the William F. Nye Company and is sold under the trade name NYE-BAR.

Figure 2:
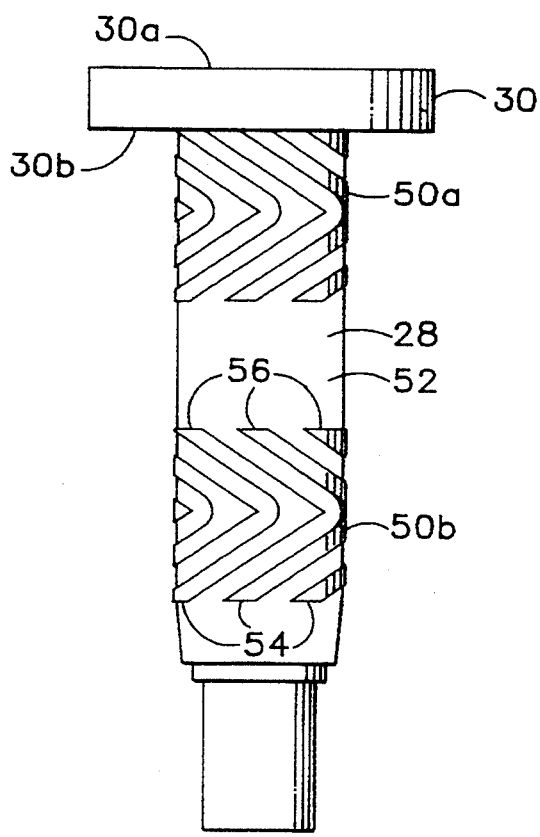
FIG. 2 is a side view of a shaft and thrust plate used in the motor of FIG. 1.

Referring to FIG. 2 the shaft 28 includes two sets of asymmetrical herringbone pattern grooves 50a and 50b separated by a space 52. The groove patterns 50a and 50b are slightly asymmetrical in that the lower leg portions 54 (for groove pattern 50b) are slightly longer than the upwardly-extending grooves 56. The same is true for the groove patterns 50a. This results in a net pressure gradient directed toward the thrust plate 30, and, consequently, into the dead end cavity sealed by the end cap 32.

Figure 3:
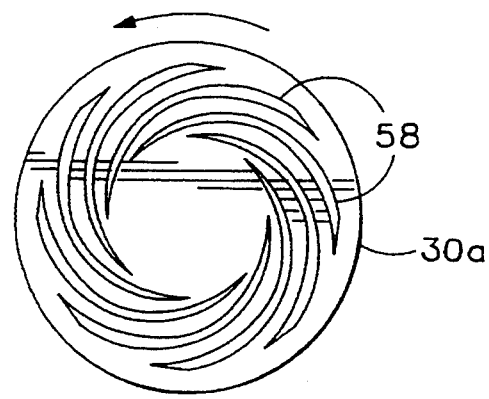
FIG. 3 is a top view of the thrust plate shown in FIG. 2.
Figure 4:
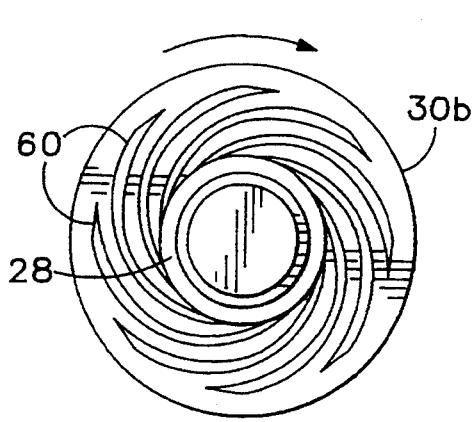
FIG. 4 is a bottom view of the thrust plate shown in FIG. 2.

The pressure gradient is further aided by the groove patterns in the upper and lower faces of the thrust plate 30. The upper groove pattern is shown in FIG. 3. The upper face of the thrust plate 30a includes spiral grooves 58. The direction of the arrow indicates the rotation of the sleeve 26 relative to the shaft 28. The grooves 58 therefore cause an inward pumping action. Similar grooves on the bottom surface of the thrust plate 30b are shown in FIG. 4. The bottom thrust plate grooves 60 are substantially similar to grooves 58 but are aligned in an opposite direction so that the rotation of the sleeve as shown by the arrow in FIG. 4 causes the grooves to produce an outward pumping pattern. The net result of the asymmetrical grooves on the shaft and the upper and lower thrust plate grooves is to establish a net pressure gradient towards the dead end cavity. This helps to maintain the integrity of the fluid seal and decrease the risk of cavitation.

Figure 6:
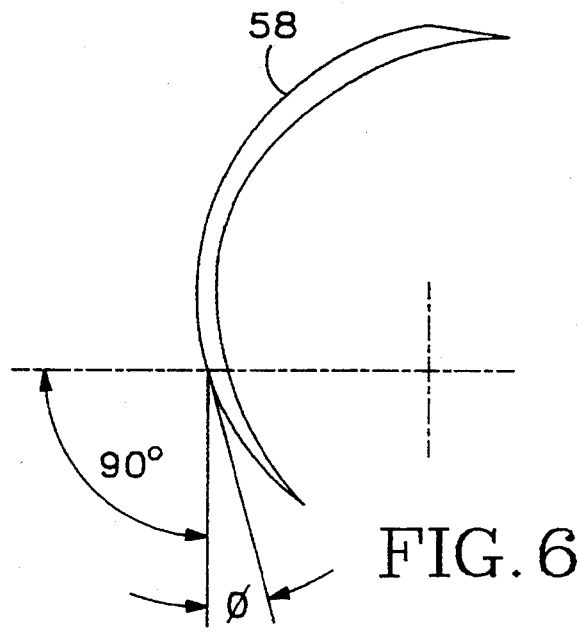
FIG. 6 is a closeup view of one of the grooves of FIG. 3.

FIG. 6 shows the pitch of the grooves 58 and 60. These are spiral grooves whose pitch $\Phi$ is about 15°. This angle represents a compromise between optimal start velocity and load capacity.

Figure 5:
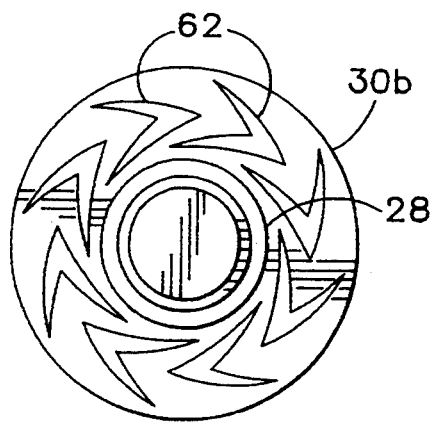
FIG. 5 is an alternate groove pattern for the thrust plate upper and lower surfaces.

An alternative groove pattern is shown in FIG. 5. Grooves having a modified "V" shape 62 are formed in the bottom surface 30b of the thrust plate 30. Other groove patterns could be used as well as long as the patterns are oriented to create a net pressure gradient towards the end cap 32.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. In an electric motor including a shaft and a housing, said housing having a sleeve for receiving said shaft, said shaft and said sleeve defining a gap therebetween, a hydrodynamic bearing construction comprising a single dead end thrust plate coupled to said shaft at a first end thereof, said thrust plate having an upper and a lower surface, a hydrodynamic fluid filling said gap between said shaft and said sleeve and generally surrounding said thrust plate, said shaft including at least one set of asymmetrical grooves for creating a pressure gradient in said hydrodynamic fluid tending to create a zone of higher pressure toward said single dead end thrust plate.

2. The hydrodynamic bearing construction of claim 1 wherein the upper and lower surfaces of the thrust plate include grooves, the grooves in the lower thrust plate surface aligned to create an outward pumping action and the grooves in the upper surface of the thrust plate aligned to create an inward pumping action.

3. The hydrodynamic bearing of claim 1 wherein the shaft includes two sets of herringbone-shaped asymmetrical grooves having a predetermined spacing therebetween.

4. The hydrodynamic bearing of claim 1 wherein said hydrodynamic fluid forms a single capillary surface tension seal near an end of said shaft opposite said dead end thrust plate.

5. A fluid bearing construction for an electric motor comprising:
    (a) a shaft;
    (b) a thrust plate coupled to a first end of the shaft;
    (c) a housing having a journal sleeve for receiving the shaft with a first portion having a diameter slightly larger than the shaft and a second portion having a second larger diameter slightly larger than the thrust plate;
    (d) an end cap inserted into the second diameter portion of the housing sealing the thrust plate off from the outside atmosphere and forming an internal cavity in said housing; and
    (e) a bearing fluid surrounding the thrust plate and the shaft and forming a capillary hydrostatic seal near a second end of the shaft opposite said first end.

6. The fluid bearing construction of claim 5 wherein said shaft includes at least one set of asymmetrical grooves journaled therein.

7. The fluid bearing construction of claim 6 wherein the asymmetrical grooves are journaled to create a pressure gradient in the bearing fluid wherein a high pressure zone of the pressure gradient is located near the thrust plate and a lower pressure zone of fluid pressure is located near the capillary seal.

8. The fluid bearing construction of claim 6 wherein said asymmetrical grooves have a herringbone-shaped pattern.

9. The fluid bearing construction of claim 5 wherein said sleeve includes at least one set of asymmetrical grooves journaled therein.

10. The fluid bearing construction of claim 6 or 9 wherein said thrust plate includes upper and lower surfaces, said upper and lower surfaces including patterned grooves, the grooves in the lower thrust plate surface arranged to create an outward pumping action and the grooves in the upper thrust plate surface arranged to create an inward pumping action.

* * * * *